United States Patent [19]

Aveneau et al.

[11] 4,105,869
[45] Aug. 8, 1978

[54] TIME-DIVISION MULTIPLEX DIGITAL TRANSMISSION SYSTEM WITH INTERMEDIATE STATIONS ADAPTED TO TRANSIT INSERT AND EXTRACT DIGITAL CHANNELS

[75] Inventors: André A. Aveneau, Longpont sur Orge; Xavier N. Barbier, Le Plessis Trevise, both of France

[73] Assignee: Societe Anonyme de Telecommunications, Paris, France

[21] Appl. No.: 857,813

[22] Filed: Dec. 5, 1977

[30] Foreign Application Priority Data

Dec. 10, 1976 [FR] France .............................. 76 37357

[51] Int. Cl.² ................................................ H04J 3/08
[52] U.S. Cl. ............................ 179/15 BD; 179/15 BS
[58] Field of Search ......... 179/15 BD, 15 BS, 15 AF, 179/15 AD, 15 BF, 15 BA

[56] References Cited
U.S. PATENT DOCUMENTS

| 2,740,838 | 4/1956 | Pierce | 179/15 BD |
|---|---|---|---|
| 3,040,130 | 6/1962 | Hughes | 179/15 BD |
| 3,987,250 | 10/1976 | Barbier et al. | 179/15 BD |
| 4,002,846 | 1/1977 | Barbier | 179/15 BD |

Primary Examiner—Thomas A. Robinson

[57] ABSTRACT

Time-division multiplex digital transmission system comprising two terminal stations and at least one intermediate station connected to one another by first and second multi-channel multiplex lines respectively corresponding to both data transmission directions, each digital channel of each multiplex line being allocated to a recurrent time-slot of a frame. Each intermediate station comprises means for transiting digital channels allocated to corresponding time-slots of multiplex lines and for extracting from one of multiplex lines to local lines of the intermediate station and for inserting from the local lines to other multiplex line digital channels allocated to corresponding time-slots according to the two transmission directions, and inversely. Each intermediate station comprises also one channel multiplexer and demultiplexer. The demultiplexer is adapted to extract and to transmit digital channels from the first or second multiplex line to given local lines respectively, when the multiplexer simultaneously inserts and transmits local channels from the given local lines to the second or first multiplex line, respectively.

3 Claims, 3 Drawing Figures

TIME-DIVISION MULTIPLEX DIGITAL TRANSMISSION SYSTEM WITH INTERMEDIATE STATIONS ADAPTED TO TRANSIT INSERT AND EXTRACT DIGITAL CHANNELS

CROSS REFERENCES TO RELATED APPLICATION

Applicants hereby make cross references to their French patent application No. PV 76 37357, filed Dec. 10, 1976 and claim priority thereunder following the provision of 35 U.S.C. 119.

BACKGROUND OF THE INVENTION

1. Field of the Invention

The present invention relates to a time-division multiplex digital transmission system in which data are transmitted in the form of multiplex pulse code modulation (PCM) words in time allocated to time slots forming a recurrent frame. The invention relates more particularly to a time-division multiplex digital transmission system of the kind comprising two terminal stations and at least one intermediate station connected to one another by way of two multi-channel multiplex lines corresponding to both transmission directions through intermediate stations in which some component channels transit without being multiplexed and other component channels are transferred, i.e. extracted from multiplex lines to local lines connected to the intermediate station, or inserted from local lines into free time slots of multiplex lines.

2. Description of the Prior Art

A time-division multiplex digital transmission system of the kind described, in which component channels may selectively transit through intermediate stations, or be transferred by coming out of a multiplex line or by entering into a multiplex line has been disclosed in the prior art, as e.g. in U.S. Pat. No. 3,987,250. To prevent data transmission from being cut off downstream of an intermediate station when the input data flow extracted in this station is cut off, each intermediate station is provided with a local time-base comprising an oscillator which can be synchronized by incoming timing bits extracted from a multiplex line. This oscillator, however, can continue to oscillate at a predetermined frequency when no incoming data signals are received from the multiplex line. This oscillator may be, for example, a voltage-controlled quartz oscillator (VCXO). The oscillator controls the single local time base which ensures, in the two data transmission directions on two multiplex lines respectively, framing, addressing for a time slot or channel in a frame and for a bit in a time slot, and controlling two multiplexers and demultiplexers, each being associated with one transmission direction. When the oscillator is no longer synchronized, it may shift, which may result in the local frame issued from local time base being out of phase with respect to a received frame. In this end, two buffer stores are provided, one for each transmission direction. Each buffer store for a given direction is controlled for write-in by timing bits extracted from the input data according to that direction, and for read-out by the single local time base.

This prior art time-division multiplex digital transmission system uses thus two multiplexers and demultiplexers for two data transmission directions respectively.

OBJECTS OF THE INVENTION

The object of the present invention is to provide a time-division multiplex digital transmission system in which each intermediate station comprises a single multiplexer and demultiplexer for two data transmission directions on the two multi-channel multiplex lines between the two terminal stations.

Another object of the present invention is to provide a time-division multiplex digital transmission system having a more simplified and less costly hardware implementation.

SUMMARY OF THE INVENTION

In accordance with the aforementioned objects, a time-division multiplex digital transmission system embodying the invention comprises two terminal stations and at least one intermediate station connected to one another by first and second multi-channel multiplex lines respectively corresponding to both transmission directions through said intermediate stations, each digital channel of each said multiplex line being allocated to a recurrent time slot of a frame. The system is adapted, in each said intermediate station, to transit digital channels allocated to corresponding time slots of said multiplex lines and to extract from one of multiplex lines to local lines of said intermediate station and to insert from said local lines to other of said multiplex lines digital channels allocated to corresponding time slots according to said two transmission directions, and inversely. Each intermediate station embodying the invention comprises means for emitting local channels from said local lines to said multiplex lines, means for receiving local channels from said multiplex lines to said local lines, first means for extracting timing signals from digital channels transmitted on said first multiplex line, second means for extracting timing signals from digital channels transmitting on said second multiplex line, a single time base controlled by said timing signals from said first or second extraction means but said time base being able to oscillate freely in absence of timing signals, first storing means for receiving digital channels from said first multiplex line, first means for addressing said first storing means for write-in by said first extracting means and for read-out by said time base, second storing means for receiving digital channels from said second multiplex line, second means for addressing said second storing means for write-in by said second extraction means and for read-out by said time base, one channel multiplexer and demultiplexer, said first and second storing means and said local channel emitting means being connected to inputs of said multiplexer, the digital channel emitting output to said first and second multiplex lines and said channel receiving means being connected to outputs of said demultiplexer, said demultiplexer being adapted to extract and to transmit digital channels from said first or second multiplex line to said local channel receiving means, respectively, when said multiplexer simultaneously inserts and transmits local channels from said local channel emitting means to said second or first multiplex line, respectively.

It should be noted that, in practice, telephone communications are bidirectional and that, when signals according to a given transmission direction of a bidirectional telephone line are inserted into one of both multiplex lines in that direction at a given intermediate station, signals in the opposite transmission direction of this bidirectional telephone line are extracted from the other multiplex line according this opposite transmission direction at the same intermediate station. One may assume that the two-way transmission channels of a telephone communication, i.e. the time slots of the multiplex lines according to the two transmission directions, are allocated two by two; more particularly, it will be assumed that it is the time slots having the same number in the two multiplex lines which are allocated to two-way transmission channels of the telephone communication. Consequently, when any channels of time slots having the same number are not transferred through the intermediate station to a local telephone line, both of them transit through the intermediate station and, in the case in which two channels of time slots having the same number in both multiplex lines are transferred between the two multiplex lines and a local telephone line, one is extracted from one of both multiplex lines and the other is inserted into the other multiplex line. It is thus possible to use only one multiplexer and demultiplexer in each intermediate station since the two MIC channels in the two transmission directions are never to be both multiplexed or demultiplexed at the same instant.

BRIEF DESCRIPTION OF THE DRAWING

The invention will now be described in detail with reference to the accompanying drawings, wherein.

DESCRIPTION OF THE PREFERRED EMBODIMENTS

Figure 1:
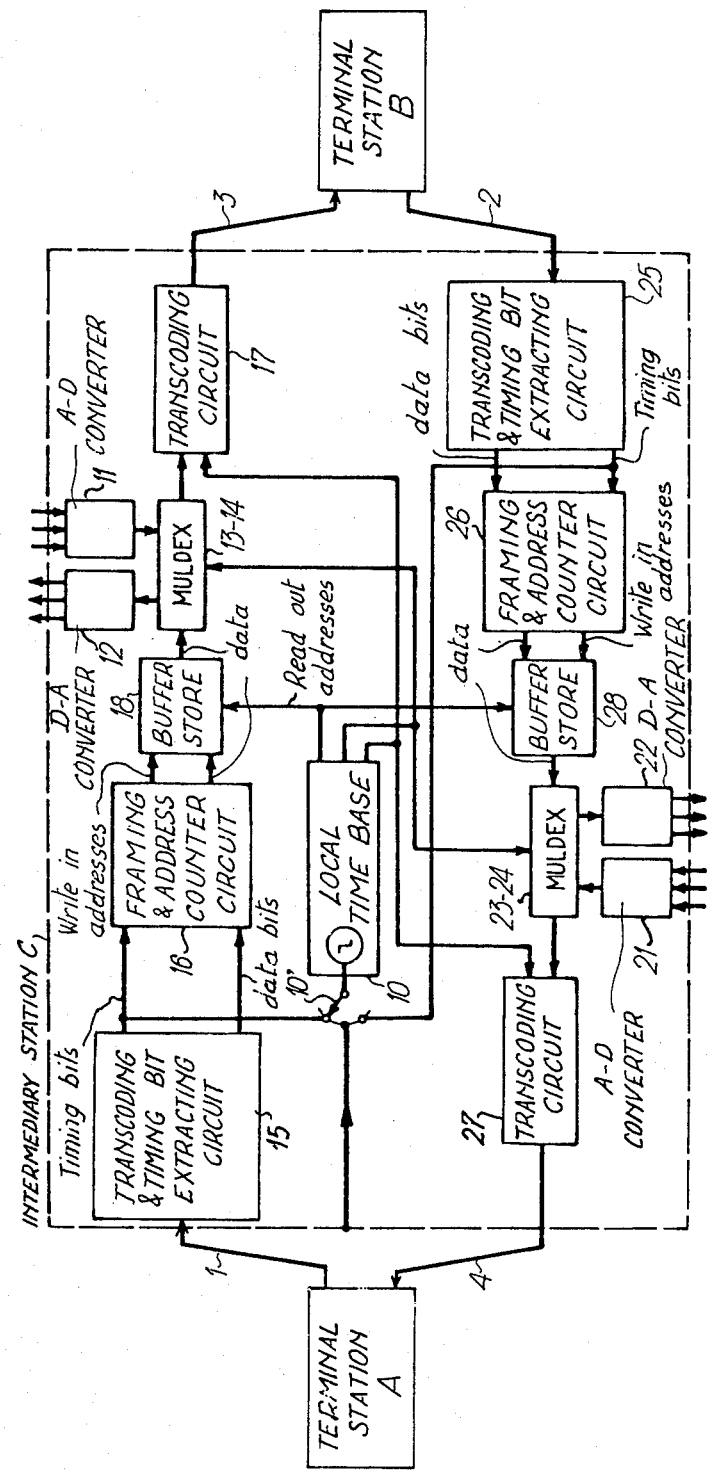
FIG. 1 shows a prior art intermediate station.

Referring first to FIG. 1, two terminal stations A and B and an intermediate station C of a prior art digital transmission system are connected therebetween by way of a digital multi-channel line 1-3 in the left-to-right transmission direction and by way of a digital multi-channel line 2-4 in the right-to-left transmission direction. The multi-channel lines are for example, as is conventional, time-division multiplex lines at a rate of 2.048 Mbits per second with a frame of 125 $\mu$s and thirty two channels or time slots of 3.9 $\mu$s, each of which contains an octet.

The intermediate station C comprises analog-to-digital converters 11 and 21, digital-to-analog converters 12 and 22, multiplexers and demultiplexers shown as "muldexes" 13, 14 and 23, 24, HDB3-to-binary transcoding and timing bit extracting circuits 15, 25, which convert the HDB3-code used on the multiplex lines into the binary code used in the station, framing and address counter circuits 16, 26, for detecting time slots of a frame and the bits of the time slot octet, and outgoing binary-to-HDB3 transcoding circuits 17, 27 which convert the binary code used in the station into the HDB3-code used on the multiplex lines. The station C also comprises one local time base 10 which is an active oscillator whose frequency is controlled by incoming timing bits output either by the circuit 15 or 25 by way of the agency of a selector 10'. Consequently, the local time base continues to operate at a predetermined frequency when no incoming signals are received from the main terminal station A.

A buffer store 18 or 28 is provided for each transmission direction. Each store is an addressable store which is addressed for write-in by the framing and address counter circuit 16 or 26, and for read-out by the local time base 10.

The local time bases of the terminal station B and other possible intermediate stations are not independent time bases but are rhythmically synchronized time bases, i.e. they have an oscillator locked on the incoming signals. The time base of the main station A is an independent time base which is the main clock of the transmission system.

It will be noted that reading-out of the channel signals to be extracted from the multiplex line 1 in the buffer store 18 is controlled by the local time base 10, and these signals are then demultiplexed by the demultiplexer 14 and transmitted to the digital-to-analog converter 12, whereas reading-out of the channel signals to be transited from the multiplex line 1 to the multiplex line 3 occurs in the same conditions and the read signals are transmitted to the transcoding circuit 17 by way of the multiplexer 13. The channel signals to be inserted in the multiplex line 3 are transmitted to the multiplexer 13 by way of the analog-to-digital converter 11, and the multiplexer 13 transmits these digital channel signals to the transcoding circuit 17.

Transit, extraction and insertion of channel signals in the other transmission direction corresponding to the multiplex line 2-4 are effected in the same manner.

Figure 2:
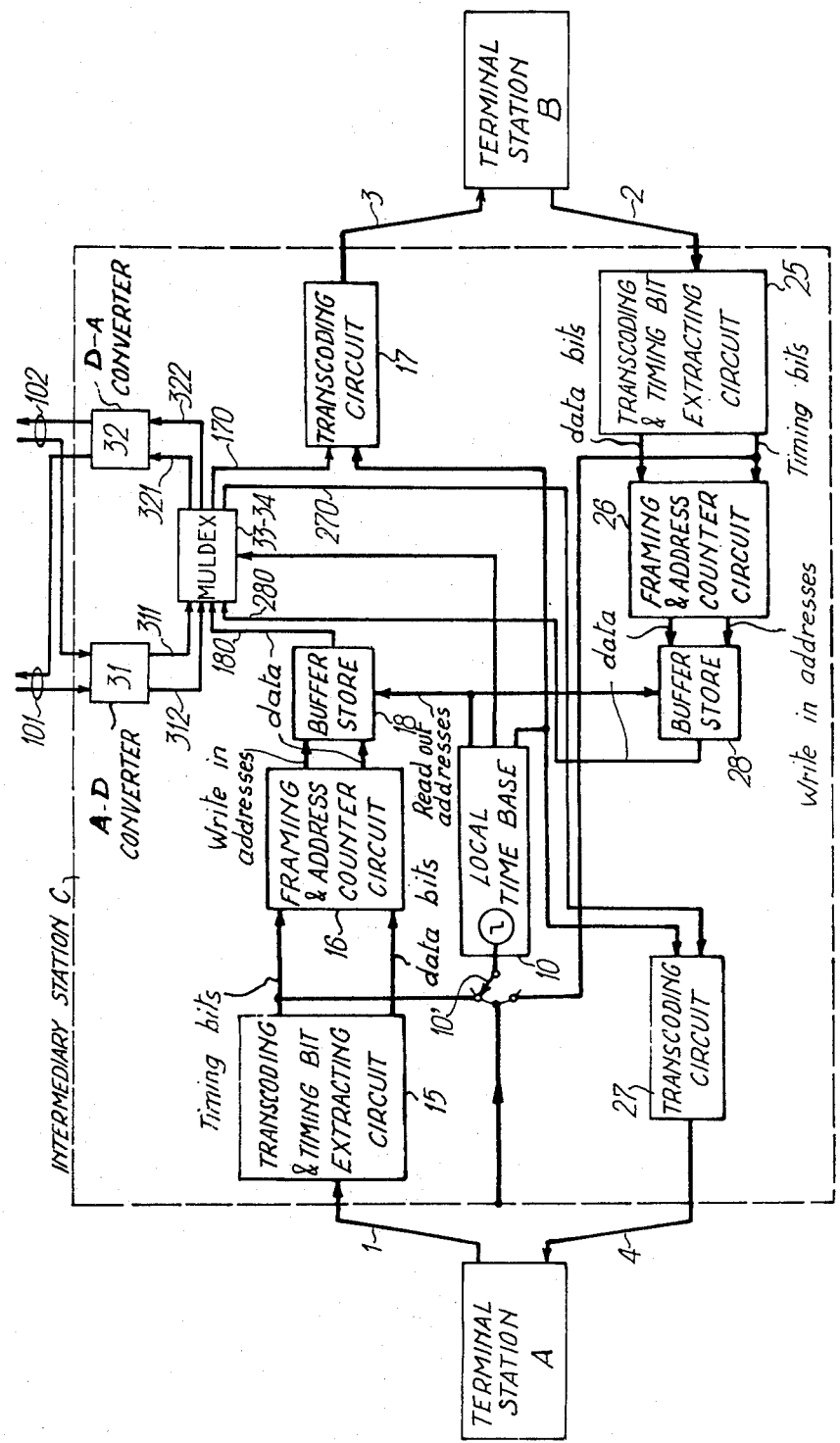
FIGS. 2 and 3 show a block diagram and a detailed circuit portion of intermediate station embodying the invention.

Referring now to FIG. 2, an intermediate station C comprises the same circuits as those shown in FIG. 1, except however, that there is one analog-to-digital converter 31 instead of two ones 11 and 21, one digital-to-analog converter 32 instead of two ones 12 and 22 and one multiplexer and demultiplexer shown as one "muldex" 33, 34 instead of two "muldexes" 13, 14 and 23, 24. In connection with the usage and definition of the terms "muldexes" and "transit", these terms are defined and used as set out in the prior art referred to under Description of the Prior Art, namely U.S. Pat. No. 3,987,250, to Xavier N. Barbier and Jean M. Lachaise granted Oct. 19, 1976. Otherwise, the same reference numerals are used as in FIG. 1 and the parts of the station common to both drawings will not be further described.

Figure 3:
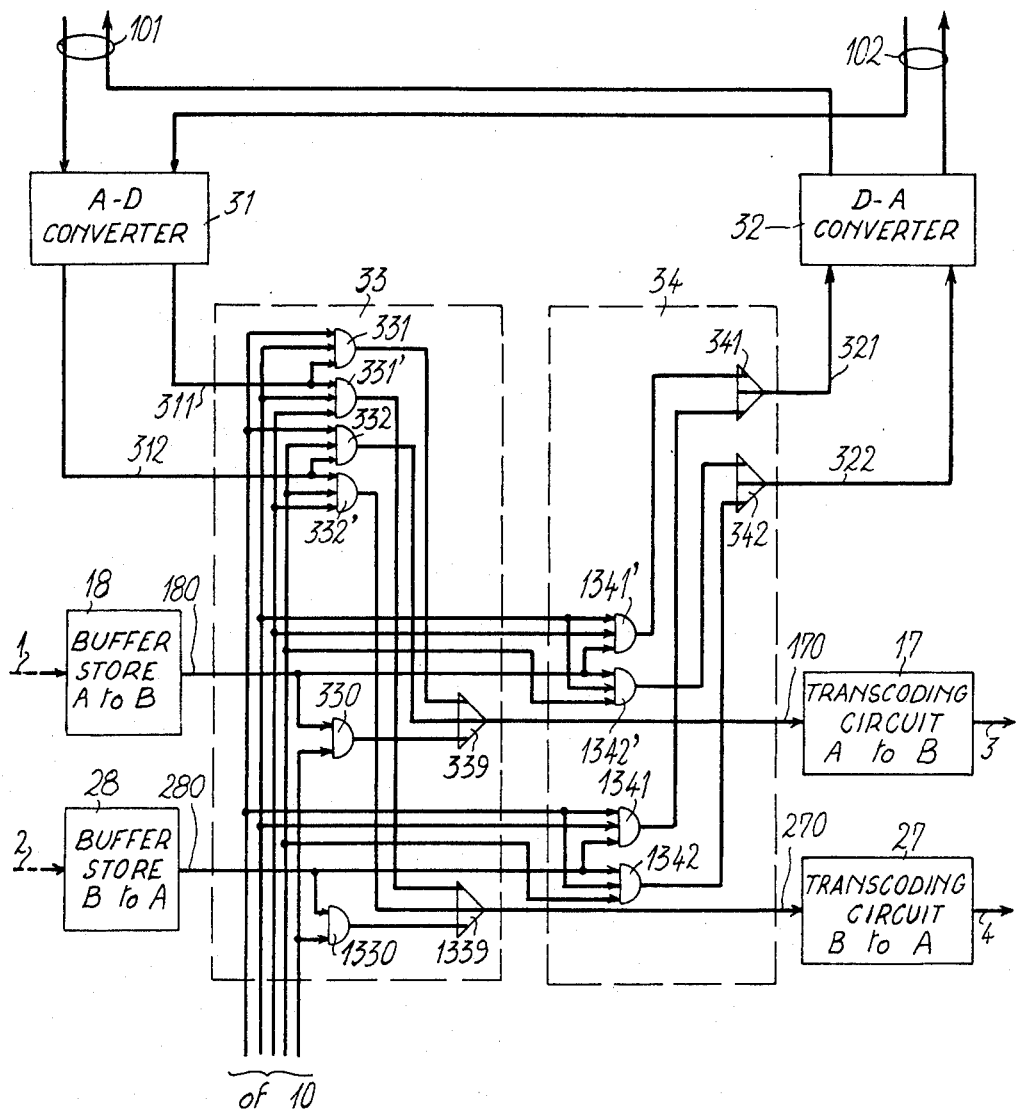

The analog telephone lines connected to the intermediate station C are assumed to be four-wire lines 101, 102, . . . their emission wires being connected to the inputs of the analog-to-digital converter 31 and their reception wires being connected to the outputs of the digital-to-analog converter 32. The outputs 180 and 280 of the buffer stores 18 and 28 are connected to inputs of the multiplexer 33 as well as to inputs of the demultiplexer 34. The outputs 311, 312, . . . of the analog-to-digital converter 31 are connected to the inputs of the multiplexer 33. The inputs 170 and 270 of the transcoding circuits 17 and 27 are connected to the outputs of the multiplexer 33. The inputs 321, 322, . . . of the digital-to-analog converter 32 are connected to the outputs of the demultiplexer 34. The multiplexer 33 and the demultiplexer 34 are of any known type and have been schematically illustrated as gates in FIG. 3.

When a channel of multiplex lines 1, 3 and 2, 4 is a transit channel, the output 180 of the buffer store 18 and the input 170 of the transcoding circuit 17 are connected together via an AND-gate 330 and an OR-gate 339 of multiplexer 33, and the output 280 of the buffer store 28 and the input 270 of the transcoding circuit 27 are connected together via an AND-gate 1330 and an OR-gate 1339 of the multiplexer 33. The AND-gates 330 and 1330 are controlled during a corresponding channel time slot by a same output control wire connected to the time base 10.

When a channel is to be transferred as, for example, between the analog line 101 and the terminal station B via multiplex lines 3 and 2, one of the channels of unidirectional reception multiplex lines 1 and 2, as e.g. the line 2, is to be extracted and the other corresponding channel of unidirectional emission multiplex lines 3 and 4, as e.g. the line 3, is to be inserted. The emission wire of the line 101 corresponding to the output wire 311 of the analog-to-digital converter 31 is connected to the input wire 170 of the transcoding circuit 17 via an AND-gate 331 and the OR-gate 339 of multiplexer 33, and the output wire 280 of the buffer store 28 is connected to the input wire 321 of the digital-to-analog converter 32 corresponding to the receiving wire of the line 101 via an AND-gate 1341 and an OR-gate 341 of demultiplexer 34. The AND-gates 331 and 1341 are controlled during a corresponding channel time slot by a same output control wire connected to the time base 10.

Similarly, when a channel is to be transferred between the analog line 102 and the terminal station A via multiplex lines 1 and 4, for example, the emission wire of the line 102 corresponding to the output wire 312 of the analog-to-digital converter 31 is connected to the input wire 270 of the transcoding circuit 27 via an AND-gate 332' and the OR-gate 1339 of multiplexer 33, and the output wire 180 of the buffer store 18 is connected to the input wire 322 of the digital-to-analog converter 32 corresponding to the receiving wire of the line 102 via an AND-gate 1342' and an OR-gate 342 of demultiplexer 34. The AND-gates 332' and 1342' are controlled during a corresponding channel time slot by a same output control wire connected to the time base 10.

Since insertion of an inputting channel must be effected either into the multiplex line 3 or into the multiplex line 4, the AND-gates 331-332, . . . of multiplexer 33 and the AND-gates 1341, 1342, . . . of demultiplexer 34 corresponding to channel transfers between the terminal station B and the analog lines 101, 102, . . . , respectively, are connected in an analogous manner to the AND-gates 331', 332', . . . of multiplexer 33 and the AND-gates 1341', 1342', . . . of demultiplexer 34 corresponding to channel transfers between the terminal station A and the analog lines 101, 102, . . . , respectively. The non-primed gates are used when insertion must be effected into the multiplex line 3 and extraction from the multiplex line 2 and the primed gates are used when insertion must be effected into the multiplex line 4 and extraction from the multiplex line 1.

The multiplexer 33 comprises the OR-gates 339, 1339, used for transit and insertion operations and the demultiplexer 34 comprises OR-gates 341, 342, . . . , used for the extraction operation.

What we claim is:

1. A time-division multiplex digital transmission system having two terminal stations and at least one intermediate station connecting said terminal stations by first and second multi-channel digital multiplex lines corresponding to both of the transmission directions through the intermediate stations, each digital channel of each multiplex line being allocated to a recurrent time slot of a frame whereby the system is adapted, in each intermediate station, to transit digital channels allocated to corresponding time slots of the multiplex lines as well as to extract digital channels from one of the multiplex lines for a local line of the intermediate station and to insert from the local line to other multiplex lines the digital channels allocated to corresponding time slots according to the two transmission directions or the reverse, each of said intermediate stations further comprising:

means for emitting local channels from said local lines to said multiplex lines;

means for receiving local channels from said multiplex lines to said local lines;

first means for extracting timing signals from digital channels transmitted on said first multiplex line;

second means for extracting timing signals from digital channels transmitted on said second multiplex line;

a single time base controlled by said timing signals from said first or second extraction means but said time base being able to oscillate freely in absence of timing signals;

first storing means for receiving digital channels from said first multiplex line;

first means for addressing said first storing means for write-in by said first extracting means and for read-out by said time base;

second storing means for receiving digital channels from said second multiplex line;

second means for addressing said second storing means for write-in by said second extraction means and for read-out by said time base;

one channel multiplexer and demultiplexer;

said first and second storing means and said local channel emitting means being connected to inputs of said multiplexer;

the digital channel emitting output to said first and second multiplex lines and said channel receiving means being connected to outputs of said demultiplexer; and said demultiplexer being adapted to extract and to transmit digital channels from said first or second multiplex line to said local channel receiving means, respectively, when said multiplexer simultaneously inserts and transmits local channels from said local channel emmitting means to said second or first multiplex line, respectively.

2. A time-division multiplex digital transmission system as claimed in claim 1 wherein each extracted channel from either said first or second multiplex line and each inserted channel into said second or first multiplex line are simultaneously allocated to same time slots in said frames of said first and second multiplex lines, respectively.

3. A time-division multiplex digital transmission system as claimed in claim 1 wherein said single multiplexer and demultiplexer comprises AND-gates;

the AND-gates connect an emitting local channel of a local line to a digital channel which is allocated to a given time slot of said first or second multiplex line; and the AND-gates connect a digital channel allocated to a time slot of said second or first multiplex line to receive the local channel of said local line, said AND-gates being controlled by a same control signal transmitted from said time base.

* * * * *